United States Patent [19]

Yamada

[11] Patent Number: 5,231,697
[45] Date of Patent: Jul. 27, 1993

[54] METHOD AND SYSTEM FOR DETERMINING CONNECTION STATES OF STRAIGHT SHORT VECTORS REPRESENTING FIGURE IN CURVE FITTING

[75] Inventor: Keiichi Yamada, Oome, Japan

[73] Assignee: Kabushiki Kaisha Toshiba, Kawasaki, Japan

[21] Appl. No.: 511,733

[22] Filed: Apr. 20, 1990

[30] Foreign Application Priority Data

Apr. 20, 1989 [JP] Japan .................................. 1-100535
Oct. 13, 1989 [JP] Japan .................................. 1-267753

[51] Int. Cl.$^5$ ............................................ G06F 15/72
[52] U.S. Cl. ................................. 395/142; 395/143; 395/141; 340/728; 340/747
[58] Field of Search ..................... 364/518, 521, 522; 340/703, 728, 747, 750, 798, 799; 381/46, 47, 56; 395/141, 142, 143

[56] References Cited

FOREIGN PATENT DOCUMENTS 2203613 10/1988 United Kingdom .

OTHER PUBLICATIONS

Technology and Science of Informatics, vol. 1, Nos. 1–6, 1983, pp. 121–134 "Segmentation of Line Drawings for Recognition and Interpretation", Masini et al.
Computer Aided Geometric Design, vol. 1, 1984, pp. 1–60, Elsevier Science Publishers B.V., Amsterdam, NL; W. Bohm et al. "A Survey . . . in CAGD".
Computer Aided Design, vol. 12, No. 4, Jul. 1980, pp. 199–201, IPC Business Press; W. Bohm: "Inserting New Knots Into B-Spline Curves".

Primary Examiner—Phu K. Nguyen
Attorney, Agent, or Firm—Cushman, Darby & Cushman

[57] ABSTRACT

In curve fitting to straight short vectors, a corner point is detected by a determination of $|Pi-Vi|>\delta$ on the basis of a connecting point Pi, an interpolation point Vi and a reference value $\delta$. After a comparison of the distance between vectors $Pi-1Pi$ and $PiPi+1$ connected at the connecting point Pi, a determination of $|Pi--Pi-1|\cos(\theta i/2)>\delta$ or $|Pi+1-Pi-1|\cos(\theta i/2)>\delta$ is performed to detect a point at which a straight line connects a curve smoothly, a point at which a curve connects a straight line smoothly or a point on a curve.

8 Claims, 8 Drawing Sheets

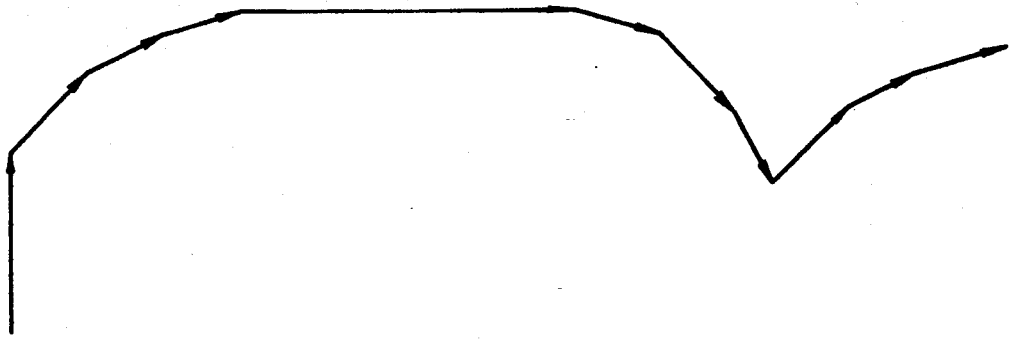
F I G. 1
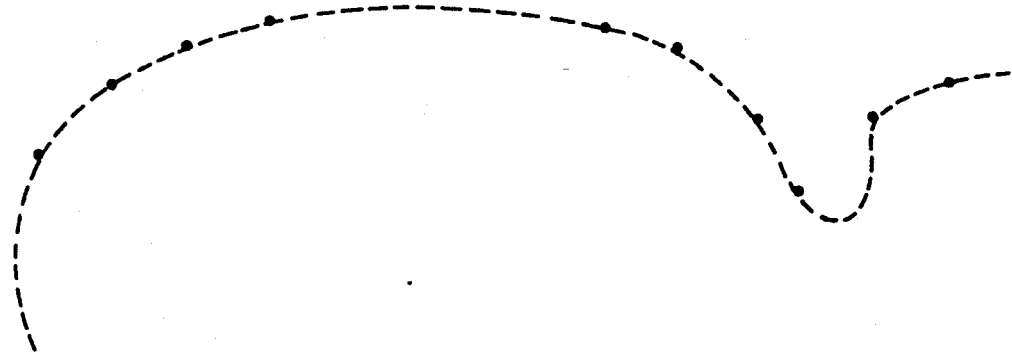
F I G. 2
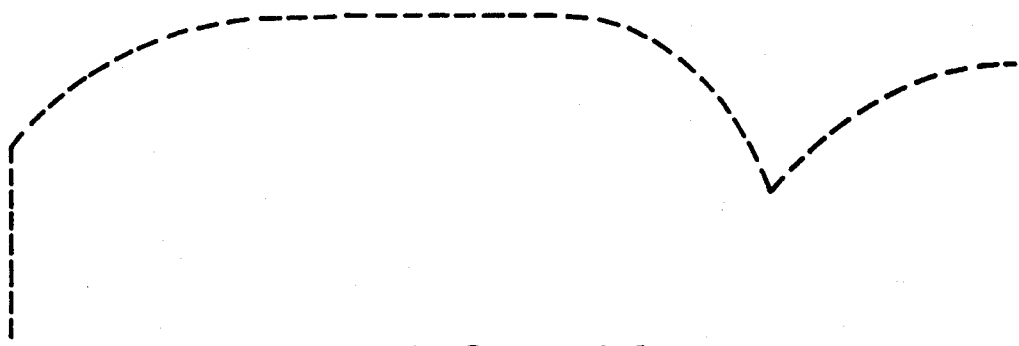
F I G. 14

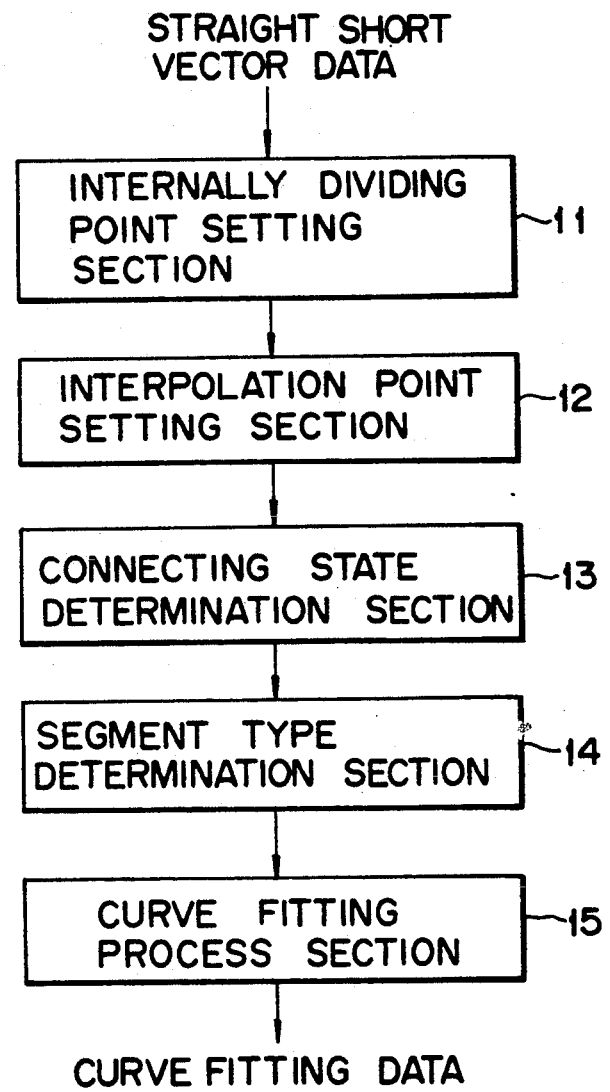
F I G. 5

| ATTRIBUTE OF VECTOR OF START POINT | ATTRIBUTE OF VECTOR OF END POINT | SEGMENT TYPE |
|---|---|---|
| T R | T L | CURVE |
| T L | T R | STRAIGHT |
| T R | C O | CURVE |
| T L | C O | STRAIGHT |
| C O | T R | STRAIGHT |
| C O | T L | CURVE |
| C O | C U | CURVE |
| C U | C O | CURVE |
| T R | C U | CURVE |
| T L | C U | — |
| C U | T R | — |
| C U | T L | CURVE |
| C O | C O | STRAIGHT |
| C U | C U | CURVE |
| T L | T L | — |
| T R | T R | — |

F I G. 10

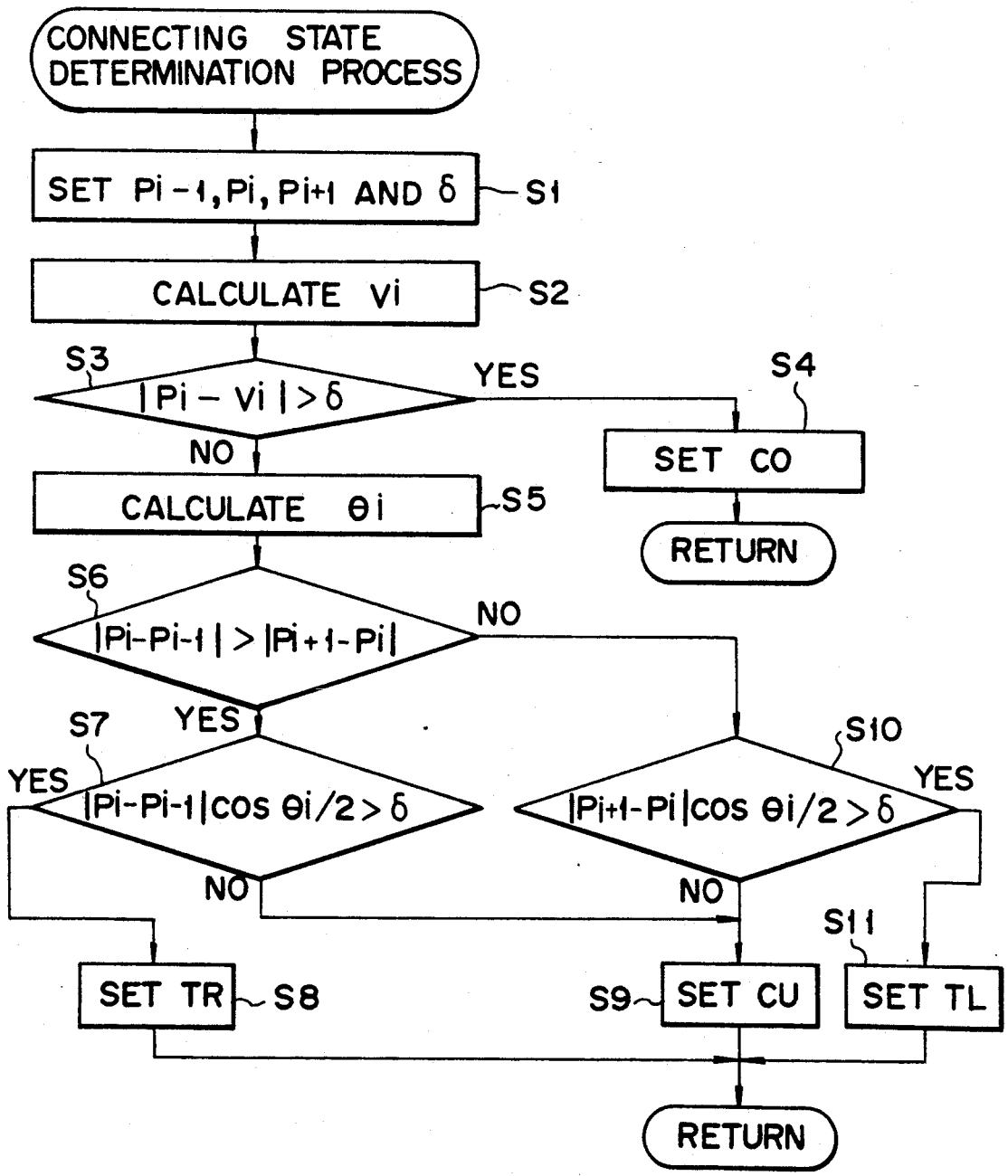
F I G. 11

METHOD AND SYSTEM FOR DETERMINING CONNECTION STATES OF STRAIGHT SHORT VECTORS REPRESENTING FIGURE IN CURVE FITTING

BACKGROUND OF THE INVENTION

1. Field of the Invention

The present invention relates to a method and system for determining the connection states of straight short vectors representing a figure.

2. Description of the Related Art

To acquire figures and outlines of characters in the field of computer graphics, computer aided design (CAD) and generation of outline fonts, a method has been used which fits, for example, a Bezier curve to a plurality of straight short vectors approximately representing an original figure.

In this method, when straight short vectors are given to represent the original figure having straight line segments and curve segments, the curve fitting is performed for each of the straight short vectors. For example, if the original figure is reconstructed with straight short vectors as shown in FIG. 1, a figure as shown in FIG. 2 will be obtained because a curve is fit to each of the straight short vectors. That is, the figure resulting from the curve fitting to a straight line segment or a corner point may differ from the original figure. In order to obtain a figure which more closely approximates the original figure, therefore, it is required to fit the curve only to curve segments of straight short vectors approximately representing the original figure.

To fit the curve only to curve segments, a point (corner point) at which the gradient in an original figure is discontinuous is detected on the basis of straight short vectors. That is, when an angle formed by two adjoining straight short vectors is less than a reference angle $\theta$ref, it is determined that the connecting point of the adjoining short vectors is a corner point. It thus becomes easy to distinguish between straight line segments and curve segments.

In some cases, however, a corner point cannot accurately be detected from straight short vectors representing the original figure. For example, when an angle $\theta 2$ at the connection point of curve segments of straight short vectors (see FIG. 4) representing the original figure shown in FIG. 3 is equal to the angle $\theta 1$ at the corner point of the original figure, both of the connecting points may be determined as being corner points or points other than corner points, depending on the reference angle $\theta$ref.

As can be seen from the above, by the method in which the connecting point of two straight short vectors is determined as being a corner point when an angle $\theta$ formed by the two straight short vectors is less than the reference angle $\theta$ref, the corner point cannot accurately be detected. Therefore, it is not easy to distinguish straight line segments and curve segments from given straight short vectors.

In view of the above, a method for determining the connecting states of connecting points is desired to distinguish straight line segments and curve segments from given straight short vectors easily.

SUMMARY OF THE INVENTION

It is an object of the present invention to provide a method and system for determining connection states of straight short vectors representing a figure.

According to one aspect of the present invention, there is provided a method for determining connection states of straight short vectors representing figure the straight short vectors being connected to connecting points and having at least one straight segment and at least one curve segment, the method comprising the steps of:

setting an interpolation point corresponding to the connecting point;

calculating a point distance between the set interpolation point and the connecting point;

comparing a desired distance with the point distance; and determining the connection state of the connecting point in accordance with a comparison result.

According to another aspect of the present invention, there is provided a system for determining connection states of straight short vectors representing a figure, the straight short vectors being connected to connecting points and having at least one straight segment and at east one curve segment, the system comprising:

means for setting an interpolation point corresponding to the connecting point;

means for calculating a point distance between the set interpolation point and the connecting point;

means for comparing a desired distance with the point distance; and means for determining the connection state of the connecting point in accordance with a comparison result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 illustrates an example of straight short vectors;

FIG. 2 illustrates the result of the curve fitting to the straight short vectors of FIG. 1;

FIG. 5 is a block diagram of a system embodying the present invention;

FIG. 10 is a diagram illustrating a segment type determining table for determining a segment type in accordance with attribute information of the start an end points of a straight short vector;

FIG. 11 is a flowchart for determining the connecting states at connecting points of straight short vectors;

FIG. 14 is a diagram illustrating the result of the curve fitting to the straight short vectors shown in FIG. 1.

DETAILED DESCRIPTION OF THE PREFERRED EMBODIMENT

Figure 3:
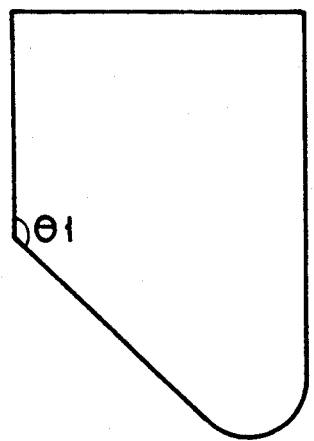
FIG. 3 illustrates an example of an original figure.
Figure 4:
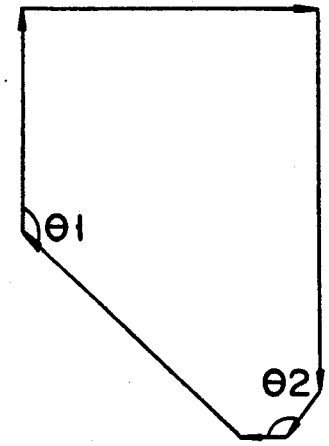
FIG. 4 illustrates straight short vectors representing the original figure shown in FIG. 3.

An embodiment of the present invention will be described below with reference to the accompanying drawings.

As shown in FIG. 5, a preferred embodiment of the present invention is a system comprising an internally dividing point setting section 11, an interpolation point setting section 12, a connecting state determination section 13, a segment type determination section 14 and a curve fitting process section 15.

Internally dividing point setting section 11 sets point $A_i$ at which the length of a straight short vector $P_{i-1}P_i$ is divided internally in a ratio of $m-1:1$ and a point $B_i$ at which the length of a straight short vector $P_iP_{i+1}$ is divided internally in a ratio of $1:m-1$ on the basis of the straight short vector data.

Interpolation point setting section 12 sets an interpolation point $U_i$ on a straight line $L_i$ passing the internally dividing points $A_i$ and $B_i$ set by internally dividing point setting section 11.

Connecting state determination section 13 determines the connecting state of the straight short vectors depending on whether or not the distance $|P_i - U_i|$ between connecting point $P_i$ and interpolation point $U_i$ is greater than a previously set reference value p.

Segment type determination section 14 determines a segment type on the basis of the connecting state of each of the connecting points which is determined by connecting state determination section 13. A curve segment and a straight line segment can thus be distinguished from each other.

Curve fitting process section 15 fits a curve to a curve segment and a straight line to a straight line segment in accordance with the segment type determined by segment type determination section 14.

Figure 7:
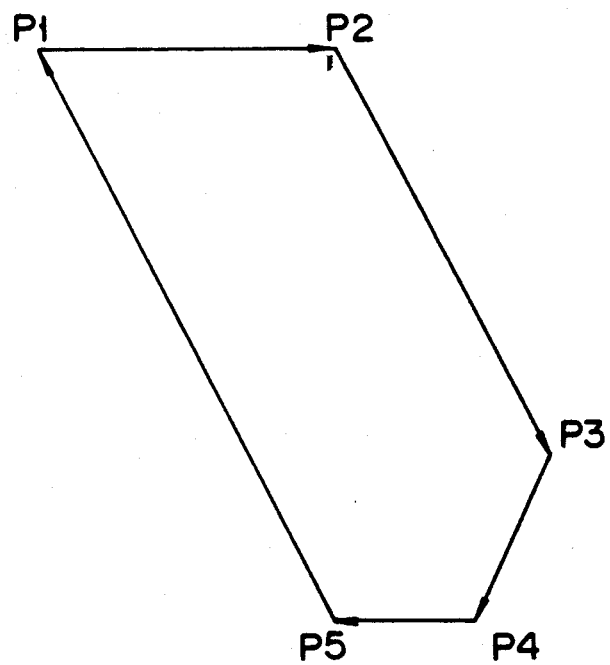
FIG. 7 illustrates an example of straight short vectors to be processed in the embodiment system.
Figure 6:
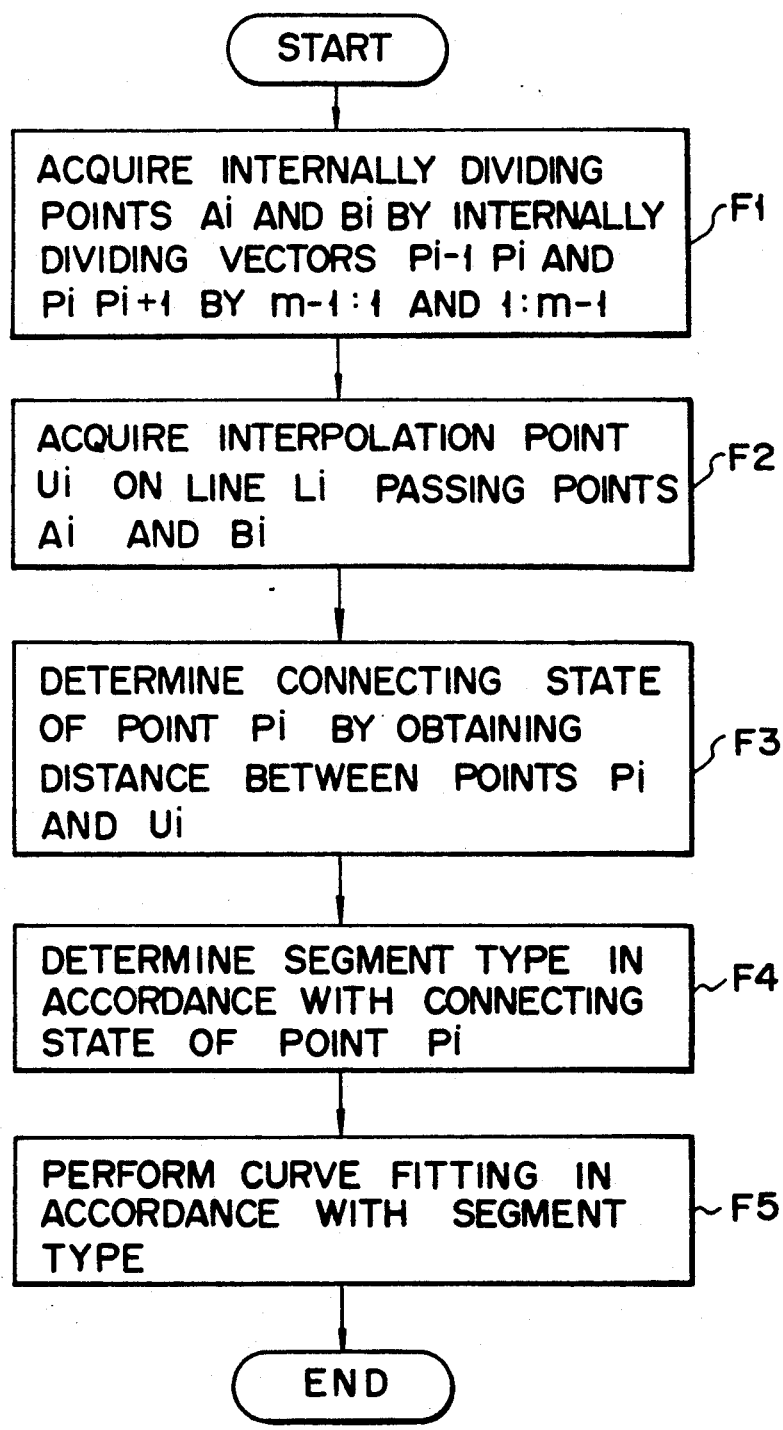
FIG. 6 is a flowchart for the operation of the embodiment system.

Next, the operation of the present system will be described in accordance with the flowchart illustrated in FIG. 6. Straight short vectors as shown in FIG. 7 are processed herein, which is comprised of vectors P1P2, P2P3, P3P4, P4P5 and P5P1.

In step F1, the points at which the lengths of straight short vectors P5P1 and P1P2 connected at connecting point P1 are respectively divided internally in ratios of $m-1:1$ and $1:m-1$ are set by internally dividing point setting section 11. In this embodiment, m is set at 6 and thus point A1 at which straight short vector P5P1 is divided internally in a ratio of 5 : 1 and point B1 at which straight short vector P1P2 is divided internally in a ratio of 1 : 5 are set.

Figure 8A:
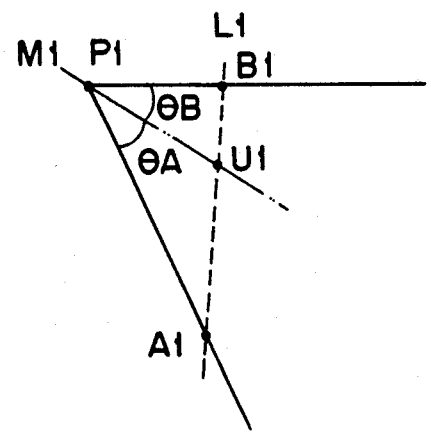
FIGS. 8A, 8B, 9A, and 9B are diagrams illustrating the acquisition of interpolation points corresponding to connecting points of the straight short vectors shown in FIG. 7.

In step F2, the straight line L1 passing internally dividing points A and B1 set by internally diving point setting section 11 is acquired by interpolation point setting section 12, and an interpolation point U1 used for a corner point detecting process is set on the straight line L1 as shown in FIG. 8A. It is to be noted that the interpolation point U1 is the intersection of the straight line L1 and the straight line M which bisects an angle formed by straight short vectors P5P1 and P1P2 such that $\theta A = \theta B$.

Figure 8B:
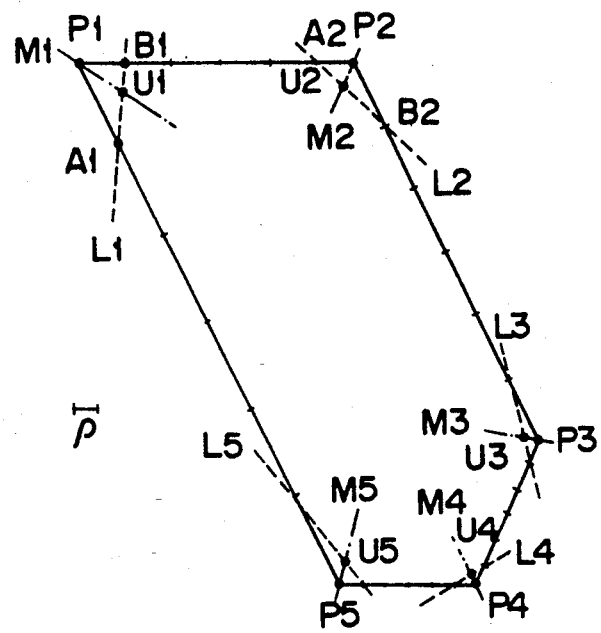

Each of interpolation points U2 to U5 corresponding to connecting points P2 to P5 of the straight short vectors is set in accordance with the above process as shown in FIG. 8B.

Figure 9A:
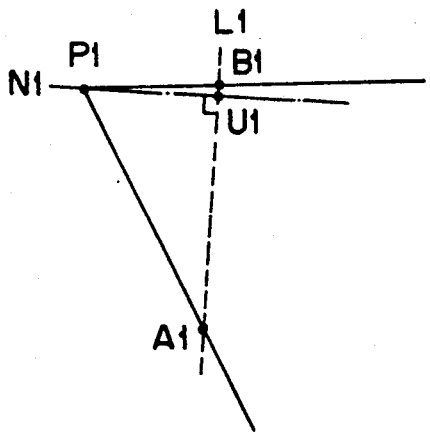

As shown in FIG. 9A, the interpolation point U1 may be set at the point of intersection of the straight line L1 which passes internally dividing points A1 and B1 and the line N1 which passes connecting point P1 of vectors P5P1 and P1P2 and is perpendicular to the straight line L1. The interpolation points U2 to U5 corresponding to connecting points P2 to P5 may be set likewise (see FIG. 9B). Alternatively, the interpolation point U1 may be set at the middle point of the line segment A1B1 from internally dividing point A1 to internally dividing point B1. The other interpolation points U2 to U5 corresponding to connecting points P2 to P5 of the straight short vectors may be set in a similar manner.

Figure 9B:
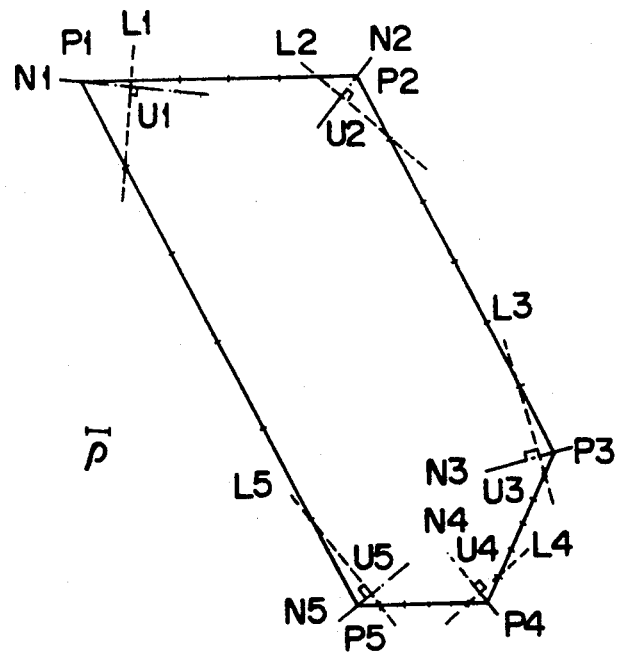

In step F3, a determination of a corner point in the original figure on the basis of a previously set reference value p is performed by connecting state determination section 13. That is, a determination of $|P_i - U_i| > \rho$ (i=1 to 5) is performed. When $|P_i - U_i| > \rho$, which means the distance between connecting point $P_i$ and interpolation point $U_i$ is greater than the reference value $\rho$, it is determined that connecting point $U_i$ is a corner point of the original figure. For example, where the reference value $\rho$ represents distances as shown in FIGS. 8B and 9B, it is determined that each of connecting points P1 and P2 is a corner point.

By using the maximum allowable distance as the reference value, therefore, a corner point can be determined on the basis of $|P_i - U_i| > \rho$. The reference value $\rho$ can be set as follows: $\rho = \delta/m = 4 \cdot \epsilon \cdot a / 6$ (m=6, $\delta = 4 \cdot \epsilon \cdot a$). Also, the reference value may be set to a desired value to determine the corner point.

In step F4, a determination of a curve segment or a straight line segment of a straight short vector representing the original figure is performed by segment type determination section 14 according to the connecting state at the connection point $P_i$. That is, in a segment type determination table as shown in FIG. 10, a segment type is determined according to the connecting states at the start and end points of a straight short vector. For straight short vector which are continuously determined as being a curve segment, it is determined a plurality of continuous straight short vectors correspond to a single curve segment.

In step F5, a curve fitting to a curve segment is performed by curve fitting process section 15 according to the result of the segment type determination, thereby acquiring curve fitting data. The curve fitting to the curve segment is performed using a Bezier curve, a spline curve or the like.

By the above process, a curve can be fit to the straight short vectors.

The determination process of the connecting state at a connecting point will be described with reference to a flowchart shown in FIG. 11. The connecting states of the connecting points of the straight short vectors are classified into the following types. It is assumed that a point representing a corner point is CO, a point TL at which a curve segment smoothly connects a straight line segment in the moving direction of a straight short vector is TL, a point at which a straight line segment smoothly connects a curve segment in the moving direction of a straight short vector is TR and a point on a curve is CU.

In step S1, the coordinates of connecting points Pi−1, Pi and Pi+1 and the reference value δ are set.

Figure 12:
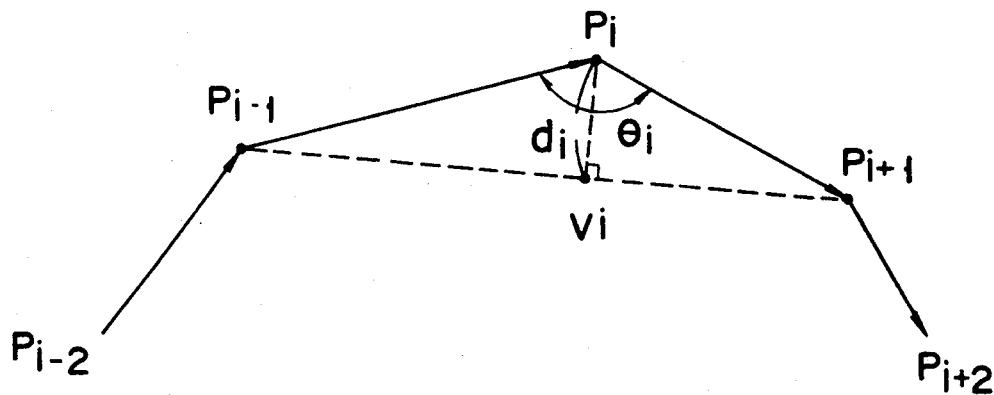
FIGS. 12 and 13 are diagrams illustrating acquisition of an interpolation point corresponding to the connecting point of straight short vectors.

In step S2, the point of intersection of the line segment Pi−1Pi+1 and the perpendicular passing connecting point Pi is obtained as an interpolation point V1 shown in FIG. 12. The interpolation point Vi is calculated by the following equation:

$$Vi = Pi-1 + [\{(Pi+1-Pi-1) \cdot (Pi-Pi-1)\} / |Pi+1-Pi-1|] \cdot (Pi+1-Pi-1) \quad (1)$$

In step S3, the distance di ($|Pi-Vi|$) between connecting point Pi and interpolation point Vi is compared with the reference value δ. That is, a determination is performed on the basis of the following expression.

$$|Pi-Vi| > \delta \quad (2)$$

When the maximum approximate error of the straight short vectors representing the original figure is ε, the reference value δ may be set as follows:

$$\delta = 4 \cdot \epsilon \cdot \alpha \quad (\alpha \geq 1) \quad (3)$$

α is set from 1.1 to 1.4. The closer α is to 1, the more easily it is determined that the connecting point Pi is CO (a corner point). Note that the equation (3) representing the reference value δ may be determined theoretically.

In step S3, when $|Pi-Vi| > \delta$, it is determined that the connecting point Pi is a corner point. Therefore, CO is set as attribute information of the connecting point Pi (step S4).

In step S3, when $|Pi-Vi| \leq \delta$, the angle $\theta i$ ($0 \leq \theta i \leq \pi$) formed by the vectors Pi-1Pi and PiPi+1 is calculated in step S5.

In step S6, a determination is performed on the basis of the following equation.

$$|Pi-Pi-1| > |Pi+1-Pi| \quad (4)$$

That is, in sep S6, the distance between the connecting points Pi and Pi−1 is compared with the distance between the connecting points Pi+1 and Pi.

When, in step S6, $|Pi-Pi-1| > |Pi+1-Pi|$, a determination is performed in step S7 on the basis of the following equation.

$$|Pi-Pi-1| \cos(\theta i/2) > \delta \quad (5)$$

Figure 13:
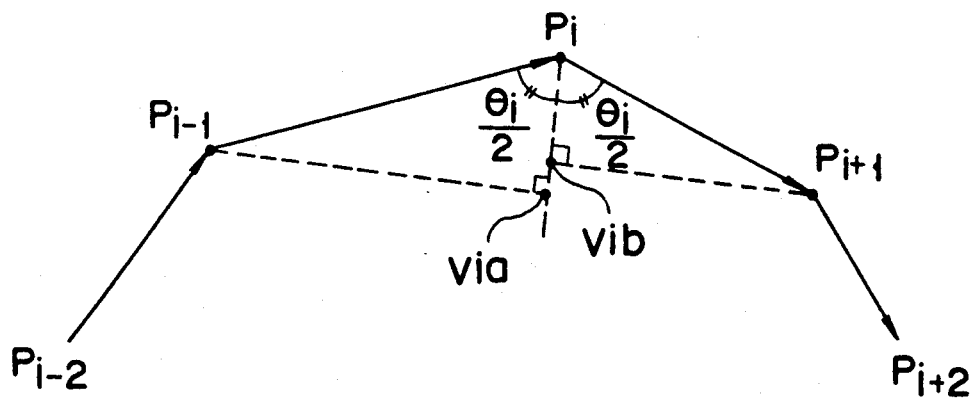

That is, in step S7, as shown in FIG. 13, the distance between connecting point Pi and point Via is compared with the reference value δ.

When, in step S7, $|Pi-Pi-1| \cos(\theta i/2) > \delta$, it is determined that the connecting point Pi is a point at which a straight line smoothly connect a curve. Therefore, TR is set as attribute information of the connecting point Pi in step S8.

When, in step S7, 51 $Pi-Pi-1|\cos(\theta i/2) \leq \delta$, it is determined the connecting point Pi is a point on a curve. Therefore, CU is set as attribute information of the connecting point Pi in step S9.

When, in step S6, $|Pi-Pi-1| \leq |Pi+1-Pi|$, a determination by the following equation is performed in step 10.

$$|Pi+1-Pi|\cos(\theta i/2) > \delta \quad (6)$$

That is, in step S10, as shown in FIG. 13, the distance between connecting point Pi and point Vib is compared with the reference value δ.

When, in step S10, $|Pi+1-Pi| \cos(\theta i/2) > \delta$, it is determined that the connecting point Pi is a point at which a curve smoothly connects a straight line. Thus, TL is set as the attribute information of the connecting point Pi in step S11.

When, in step S10, $|Pi+1-Pi| \cos(\theta i/2) \leq \delta$, it is determined that the connecting point Pi is a point on a curve. Thus, CU is set as the attribute information of the connecting point Pi in step S9.

By the above process, the connecting state of the connecting point Pi is determined.

As described above, when an original figure is reconstructed into straight short vectors as shown in FIG. 1, a figure that more closely approximates the original figure as shown in FIG. 14 can be obtained by fitting a curve only to a curve segment.

According to the present invention, the corner point of the original figure is detected by the determination of $|Pi-Vi| > \delta$ based on the connecting point Pi, interpolation point Vi (Via, Vib) and previously set reference value δ. Furthermore, by determining $|Pi-Pi-1| \cos(\theta i/2) > \delta$ or $|Pi+1-Pi| \cos(\theta i/2) > \delta$ according to the result of the comparison of the distance between the vectors Pi−1Pi and PiPi+1 connected at the connecting point Pi, a point at which a straight line connects a curve smoothly, a point at which a curve connects a straight line smoothly or a point on a curve is detected. Accordingly, corner points can be detected more accurately than in the conventional manner.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit and scope of the general inventive concept as defined by the appended claims and their equivalents.

What is claimed is:

1. A method for generating and displaying a curved image, comprising the steps of:

receiving an image in the form of straight short vectors, said straight short vectors corresponding to at least one straight segment and at least one curve segment;

analyzing connecting points of said straight short vectors to distinguish between connecting points of said at least one straight segment and said at least one curve segment, said connecting points being a point between two adjoining straight short vectors;

fitting a curve to said at least one curve segment and a straight line to said at least one straight segment; and thereby generating a curved image in the form of said curve and said straight line;

wherein said connecting points analyzing step includes the steps of:

setting an interpolation point corresponding to each of said connecting points;

calculating a point distance between each said set interpolation point and a corresponding one of said connecting points;

comparing a predetermined distance with said point distance; and thereby determining each of said connecting points as being connection points of said straight segment or said curve segment.

2. The method according to claim 1, wherein said connecting points analyzing step includes the step of determining whether or not each of said connecting points is a corner point.

3. The method according to claim 1, wherein said connecting points analyzing step includes the steps
   determining whether or not a length of a first straight short vector connected to each of said connecting points as an end point is loner than that of a second straight short vector connected to same one of said connecting points as a starting point;
   determining whether or not each of said connecting points is a point for connecting said straight segment to said curve segment in a moving direction of said straight short vectors in accordance with a determination result concerning said lengths of said first and said second straight short vectors; and
   determining whether or not each of said connecting points is a point for connecting said curve segment to said straight segment in a moving direction of said straight short vectors in accordance with a determination result concerning said lengths of said first and said second straight short vectors.

4. The method according to claim 1, wherein said curve includes a Bezier curve.

5. a system for generating and displaying a curved image, comprising:
   means for receiving an image in the form of straight short vectors, said straight short vectors corresponds to at least one straight segment and at least one curve segment;
   means for analyzing connecting points of said straight short vectors to distinguish between connecting points of said at least one straight segment and said at least one curve segment, said connecting point being a point between two adjoining straight short vectors;
   means for fitting a curve to said at least one curve segment and a straight line to said at least one straight segment in response to said determining means; and
   means for generating a curved image in the form of said curve and said straight line in response to said fitting means;
   wherein said means for analyzing connecting points includes:
   means for setting an interpolation point corresponding to each of said connecting points;
   means for calculating a point distance between each said set interpolation point and a corresponding one of said connecting points;
   means for comparing a predetermined distance with said point distance; and
   means for determining each of said connecting points as being connection points of said straight segment or said curve segment.

6. The system according to claim 5, wherein said means for analyzing connecting points includes means for determining whether or not each of said connecting points is a corner point.

7. The system according to claim 6, wherein said means for analyzing connecting points includes:
   means for determining whether or not a length of a first straight short vector connected to each of said connecting points as an end point is longer than that of a second straight short vector connected to a same one of said connecting points as a starting point;
   means for determining whether or not each of said connecting points is a point for connecting said straight segment to said curve segment in a moving direction of said straight short vectors in accordance with a determination result concerning said lengths of said first and said second straight short vectors; and
   means for determining whether or not each of said connecting points is a point for connecting said curve segment to said straight segment in a moving direction of said straight short vectors in accordance with a determination result concerning said lengths of said first and second straight short vectors.

8. The system according to claim 5, wherein said curve fitting means includes means for fitting a Bezier curve to said curve segments.

* * * * *